US012809947B2

(12) United States Patent
Lyons et al.

(10) Patent No.: US 12,809,947 B2
(45) Date of Patent: Nov. 24, 2026

(54) DIGITAL MEDIA SOURCE IDENTIFICATION USING STRUCTURAL SIGNATURES

(71) Applicant: Medex Forensics, Inc., Madison, WI (US)

(72) Inventors: Bertram C. Lyons, Madison, WI (US); Walter Bruehs, Quantico, VA (US); Daniel John Fischer, Verona, WI (US)

(73) Assignee: Medex Forensics, Inc., Madison, WI (US)

( * ) Notice: Subject to any disclaimer, the term of this patent is extended or adjusted under 35 U.S.C. 154(b) by 34 days.

(21) Appl. No.: 18/972,278

(22) Filed: Dec. 6, 2024

(65) Prior Publication Data

US 2026/0161748 A1 Jun. 11, 2026

(51) Int. Cl.
*G06F 21/10* (2013.01)
*G06F 40/205* (2020.01)

(52) U.S. Cl.
CPC ........ *G06F 21/1065* (2023.08); *G06F 40/205* (2020.01)

(58) Field of Classification Search
CPC ........................... G06F 21/1065; G06F 40/205
USPC ........................................................... 726/32
See application file for complete search history.

(56) References Cited

U.S. PATENT DOCUMENTS 8,988,219 B2 * 3/2015 McCloskey .......... G08B 29/046 340/500

FOREIGN PATENT DOCUMENTS

WO WO-2006017031 A1 * 2/2006 ........... G06T 7/0008

* cited by examiner

*Primary Examiner* — Bryan F Wright
(74) *Attorney, Agent, or Firm* — Mintz Levin Cohn Ferris Glovsky and Popeo, P.C.

(57) ABSTRACT

An image file can be analyzed by leveraging structural elements and key-value pairs to determine the type of device and the type of program that wrote the image file. The image file can be received and parsed to identify a plurality of structural elements. Based on one or more identified structural elements, at least a first marker, sub-marker, or key-value pair and a second marker, sub-marker, or key-value pair can be determined. A profile structural signature can be generated from the identified structural elements and at least the marker, sub-marker, or key-value pairs within each identified structural element that characterizes a combination of attributes specific to a type of device and program that wrote the image file. The profile structural signature can be visually represented and provided using a graphical user interface (GUI). Related apparatus, systems, techniques, and articles are also described.

20 Claims, 6 Drawing Sheets

200

DIGITAL MEDIA SOURCE IDENTIFICATION USING STRUCTURAL SIGNATURES

GOVERNMENT LICENSE RIGHTS

This invention was made with Government support under contract numbers DJF-15-1800-P-0004974 (including amendments DJF-17-1200-P-0001851 (including amendments) and DJF-16-1200-P-0004616 (including amendments) awarded by the Federal Bureau of Investigation. The Government has certain rights in the invention.

TECHNICAL FIELD

The subject matter described herein relates to source identifying forensics for digital media, including digital images.

BACKGROUND

Digital media includes a wide array of communication content that can be created, viewed, and distributed across various digital electronic platforms. Various file writers, such as electronic devices and/or software can create digital media. For example, smartphones can generate digital media such as recording audio, picture, and video content. Further, smartphones can utilize various operating systems to generate digital media, such as IOS or Google's Android mobile operating systems. Electronic devices can further use software applications, such as Adobe Premier or smartphone camera applications, to generate the digital media.

Digital media can be examined using digital forensics to identify and preserve information relating to its origins. One aspect of digital forensics involves analyzing data found in a digital media file (e.g., file structural data or image data) to determine its source, such as identifying the type of device that created the digital media.

Some forms of digital media, particularly Joint Photographic Expert Group (JPEG) image files, are commonly encountered due to their widespread adoption in consumer electronics and digital image formats. JPEG image files can include multiple structural elements that define the image, including the compressed or uncompressed image data and structural data that consist of headers and markers.

The file structural elements of JPEG images can be analyzed to uncover digital forensics information, such as the type of device that created the image, whether the image was modified, and whether the image was compressed. Due to JPEG's widespread adoption, the composition of these file structural elements can vary significantly due to factors such as the encoder that produced the file, the degree of file compression, and the device compatibility. Other variations can include differences in acquisition parameters, internal file and data structures, sub-specifications of the JPEG umbrella file formats, and the like. Additionally, as JPEG images are resized, shared, compressed, and edited, extraneous information can be added to the compressed or uncompressed image data.

The significant variations in the file structural data can make it more difficult to find the necessary forensic information for purposes of determining a type of device or type of program that created the JPEG image file. Further, even when specific information about the file's source is present in the file structural data as stored metadata, such metadata can be easily changed or removed. Conventionally, there is no automated or practical approach to identify hardware and/or software sources of JPEG image files on a large-scale using file format structural analysis (instead of using conventional metadata analysis). There is a continuing need for such an automated and practical approach, including systems, devices, and methods that will parse the file structural components within JPEG image files and compare them in such a way as to make a determination of the hardware and/or software source for such files.

SUMMARY

In an aspect, an image file is received. The image file can be parsed to identify a plurality of structural elements of the image file. Based on one or more identified structural elements, at least a first marker, sub-marker, or key-value pair and a second marker, sub-marker, or key-value pair associated with the image file can be determined. Based on the identified structural elements and at least the first marker, sub-marker, or key-value pair and the second marker, sub-marker, or key-value pair, at least one profile structural signature can be generated that characterizes a combination of attributes specific to at least one of a type of device and a type of program that wrote the image file. A visual representation of the profile structural signature can be provided using a graphical user interface, where the visual representation includes a mapping of at least the first marker, sub-marker, or key-value pair and the second marker, sub-marker, or key-value pair.

One or more of the following features can be included in any feasible combination. For example, a percentage match between the at least one profile structural signature and a plurality of profile structural signatures associated with a database can be determined. An indication can be provided, by using a graphical interface, of at least one type of device or program associated with at least one of the plurality of profile structural signatures in response to the percentage match satisfying a percentage match threshold. The determining a percentage match can further comprise comparing at least the first marker, sub-marker, or key-value pair and the second marker, sub-marker, or key-value pair with a plurality of markers, sub-markers, or key-value pairs associated with the plurality of profile structural signatures. A percentage match can be determined based on a level of similarity during the comparison.

The generated at least one profile structural signature can be transformed into a normalized profile structural signature. When determining a percentage match, the normalized profile structural signature can be compared to the plurality of structural signatures associated with a database. The normalized profile structural signature can be stored in the database.

Generating the at least one profile structural signature can further comprise determining a position of the one or more identified structural elements in a sequence of the plurality of structural elements of the image file. An arrangement of at least the first marker, sub-marker, or key-value pair and the second marker, sub-marker, or key-value pair can be determined relative to a plurality of markers, sub-markers, or key-value pairs associated with the plurality of structural elements. The generation of the at least one profile structural signature can further comprise a presence or absence of additional markers, sub-markers, or key-value pairs among the first marker, sub-marker, or key-value pair and the second marker, sub-marker, or key-value pair in a predetermined order.

The first marker, sub-marker, or key-value pair can include a first sequence of bytes corresponding to a first grouping of data structures. The second marker, sub-marker, or key-value pair can include a second sequence of bytes corresponding to a second grouping of data structures, the second grouping including a greater number of data structures than the first grouping.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
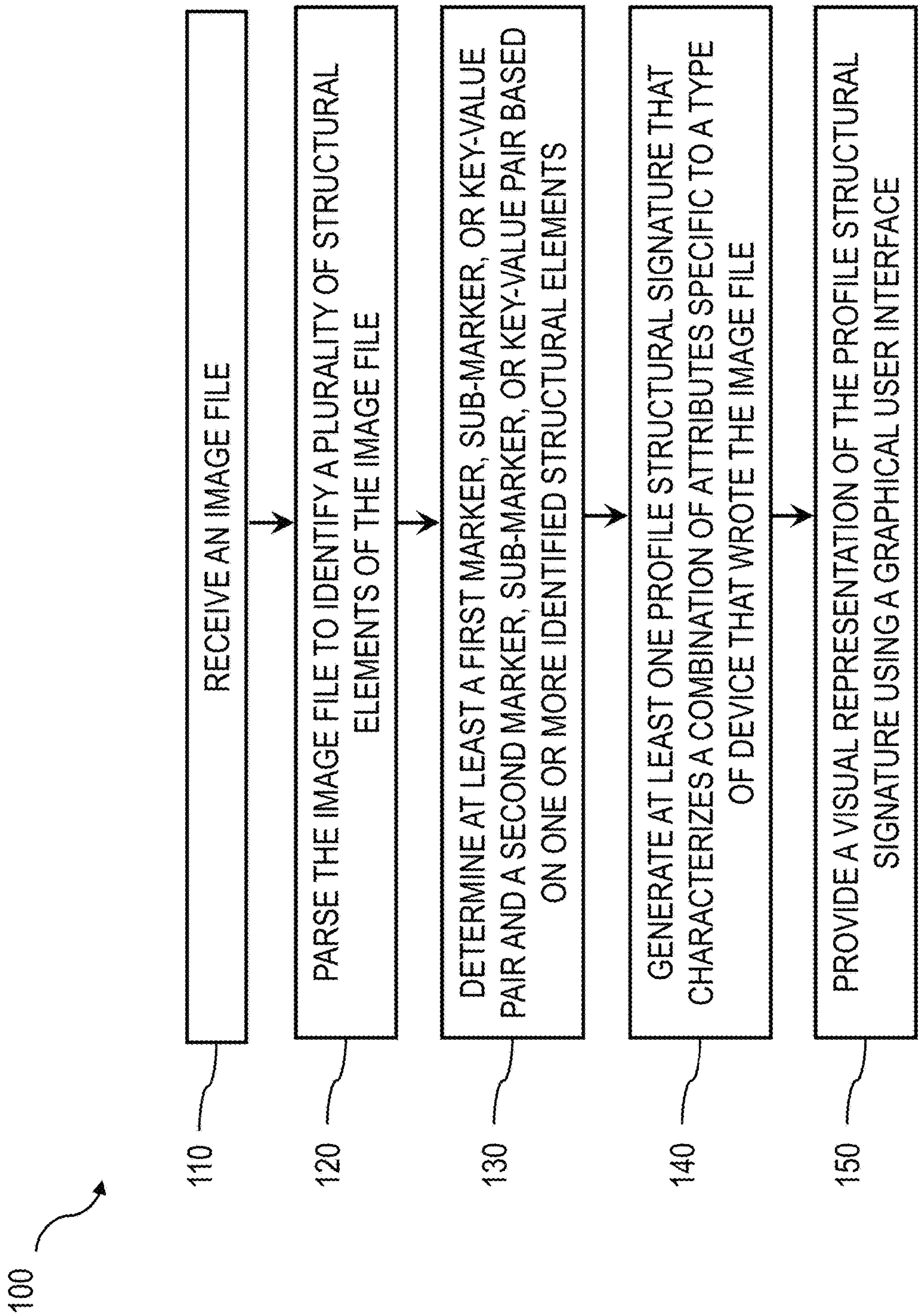
FIG. 1 is a process flow diagram illustrating an example process of generating at least one profile structural signature based on a first marker, sub-marker, or key-value pair and a second marker, sub-marker, or key-value pair associated with an image file.

Digital Forensics involves the application of investigation and analysis techniques to gather and preserve information related to digital media. One aspect of digital forensics involves analyzing multimedia files to determine information about the device that produced the multimedia file.

Traditionally, analyzing a multimedia file using digital forensic methods relies upon analyzing the data, typically called metadata, stored within the structural elements of the multimedia file to determine the source device. While this approach can work with some multimedia formats, metadata is known to be easily edited or changed and is not a resilient signal for forensic analysis. For example, metadata can indicate the camera brand, model, or software application that created the image file. However, because the metadata is not resilient and can be easily altered, the credibility of the information can be called into question when used in forensic analysis.

Further, some complex image file formats present unique challenges and opportunities. For example, unlike other multimedia files, some image files (e.g., JPEG images) can vary significantly in their structural composition depending on the device and encoder used to produce the image. As a result, interpreting the structural components accurately, and identifying data within the structural elements of the image file, such as data within the markers and headers, can differ greatly and make it challenging for traditional forensic approaches to reliably attribute an image file to its source device or program. Moreover, analyzing the data within the structural elements can yield inconsistent or unknown results due to the wide variance of the proprietary encoders or alterations in the image due to compression or other operations.

Accordingly, some implementations of the current subject matter include an approach to analyzing structural elements of the image file, such as markers, sub-markers, or key-value pairs, to generate a profile structural signature that characterizes a combination of structural objects and attributes specific to the type of device or program that wrote the image file. A graphical user interface (GUI) can provide a visual representation of the profile structural signature including the presence and sequence of the structural elements of the image file. By analyzing the structural elements of the image file, such as the sequence of markers, sub-markers, and key-value pairs, this approach does not require prior knowledge of the encoder utilized by the device or program or its proprietary data format as it can rely on the structural characteristics that are inherent in the image file authored by a device or program and/or a type or device and/or program. Additionally, while metadata can be easily altered or tampered with, the structural analysis can be more resilient to manipulation. Further, this can provide a viable approach for source identification in cases where the metadata is missing, corrupted, or otherwise indecipherable. As another benefit, the visual representation of the profile structural signature can provide previously unknown analytics about the image file, such as the depth or pattern of the structural elements which can be unique or distinct to the source device or program and/or type of source device or program.

In some implementations, the profile structural signature is generated by analyzing the sequence and relative position of one or more structural elements relative to a sequence of other structural elements in the image file. By analyzing the relative position and sequence of the structural elements, this can avoid the challenges of encountering unknown or uninterpretable data values.

In addition, some implementations of the subject matter can include providing an indication of a type of device or type of program that wrote the image file by determining a percentage match of the profile structural signature with a plurality of structural signatures. In some implementations, the percentage match can be determined by comparing the structural elements of the image file, e.g., key-value pairs, with key-value pairs associated with a plurality of structural signatures. By comparing the sequence positioning and hierarchy of the markers, sub-markers, and the keys from key-value pairs, this can circumvent many of the challenges of traditional forensic methods. For example, due to the high variances in the encoders and devices used to create the image file, traditional forensic methods can often struggle to reliably determine the type of device or type of program that wrote the image file. In such cases, if the encoder used to produce the image file is unknown or the encoder specification or algorithm is updated, the image data within the structural elements can become undecipherable.

Further, if the image data is altered or corrupted, traditional forensic analysis methods can struggle in determining the image file source. By contrast, analyzing the sequence and hierarchy of markers, sub-markers, and the keys from key-value pairs within the structural elements of the image file can provide more efficient and reliable analysis because this approach can examine the image's structural organization rather than the data itself. This obviates the need to expand, analyze, and compare the image data with vast amounts of image data associated with known source devices, which can be computationally expensive and resource consuming. Further, the sequence and hierarchy of the markers, sub-markers, and keys from the key-value pairs can be less susceptible to the variations in the specific encoder or alteration in the image file. This can provide a more robust and predictable method for determining the source device even when the image data is indeterminate or altered.

FIG. 1 is a process flow diagram illustrating an example method 100 of generating at least one profile structural signature based on a first marker, sub-marker, or key-value pair and a second marker, sub-marker, or key-value pair associated with an image file.

At 110, an image file can be received. The image file can include a compressed series of bytes corresponding to a digital image, including but not limited to images received using the JPEG format type. The image file can include multiple structural elements that define and include the image data. For example, the image file can include header objects which can include data about the file such as the format, size, and encoding information. The image file can also include a plurality of markers, sub-markers, and key-value pairs, which can indicate and include data about the characteristics of the image file. Additionally, the image file can include compressed or uncompressed image data, which represents the pixel values of the image in a format of bytes.

While certain embodiments reference JPEG image files, the techniques described herein may be applied to other image file formats or types that include similar structural elements, such as headers, markers, and compressed data segments.

At 120, the image file can be parsed to identify a plurality of structural elements of the image file. In some implementations, the image file can be parsed by analyzing the image file's binary structure (e.g., stored sequence of bytes) to extract specific data components. In some implementations, the image file can be parsed according to a specialized algorithm or decoder designed to decode the specific format of the image file. In some implementations, the image file can be parsed to extract and identify a plurality of markers and key-value pairs in the image file. A marker is a byte sequence within an image file that can signify the start of a specific data segment corresponding to the image file. The markers, represented by specific byte sequences, can be recognized while parsing the image file. For example, for JPEG files, the byte sequence "0xFF" can signify the start of the marker. Additionally, the marker can include an additional byte sequence to signify the type of marker. For example, in JPEG files, the byte sequence "0xFFC0" can signify the start-of-frame 0 (SOF0) marker. In some implementations, the marker can further include a variable length of bytes containing key-value pairs corresponding to information about the image file. In some implementations, the marker can include further markers (e.g., sub-markers) or sub-directories corresponding to the image file.

The image file can be parsed by delineating between different markers. For example, the image file can be parsed until the byte sequence "0xFF" is reached, corresponding to the start of a first marker. The compressed series of bytes following "0xFF" correspond to the first marker until another byte sequence "0xFF" is reached, which corresponds to the start of the second marker.

At 130, within a given marker or structural element, at least a first key-value pair and a second key-value pair can be determined. A key-value pair can represent a specific attribute or characteristic of the image file. For example, a key-value pair can identify a particular structural element in the image file and provide corresponding data associated with that structural element.

In some implementations, at least a first key-value pair and a second key-value pair can be determined based on a marker. For example, the marker can include a variable length of bytes including encoded key-value pairs. The key-value pairs can be identified, decoded, and extracted from the marker while parsing the image file. Information in each key-value pair can correspond to an attribute of the image file, such as the color space, device attributes, image resolution, and other characteristics of the image file. As one example, a JPEG image can include an Application Segment 2 (APP2) marker beginning with the byte sequence "0xFFE2". The APP2 marker can include a compressed series of bytes after "0xFFE2" including encoded key-value pairs, such as key-value pairs identifying the profile size, version, class, color space, signature, device manufacturer, device model, etc. In some implementations, the encoded key-value pair can include a sequence of bytes corresponding to a first grouping of data structures specific to an attribute or signature. For example, a key-value pair corresponding to the "device model" can include bytes corresponding to the specific model of the device that wrote the image file (e.g., iPhone 15). In some implementations, the key-value pairs can be associated with sub-markers or sub-directories.

In some implementations, some of the key-value pairs may not be determined due to variability in the image file format or an understanding of the encoder used to generate the image file. For example, some encoders used to produce the image file can include proprietary key-value pairs encoded in the markers. However, in some instances even if the key-value pairs cannot be identified, the presence of the key-value pairs can still be identified from the byte sequence.

At 140, at least one profile structural signature can be generated based on at least the first marker, sub-marker, or key from a key-value pair and the second marker, sub-marker, or key from a key-value pair. The profile structural signature can characterize a combination of attributes specific to at least one type of device and a type of program that wrote the image file. In some implementations, the profile structural signature can include the ordinal locations of the markers, sub-markers, and keys from key-value pairs identified in the image file. The marker, sub-marker, and key positions can be determined relative to the location of other markers, sub-markers, and keys. For example, the profile structural signature can reflect the structural order in which a specific marker, such as the APP2 marker, appears in relation to other markers in the image file. Additionally, the profile structural signature can reflect the order in which specific key-value pairs, such as the color space, signature, or device manufacturer, are arranged relative to other key-value pairs. This can provide a unique structural blueprint of the type of device and the type of program used to create the image file.

The sequence in which the markers, sub-markers, and key-value pairs are organized in the image file can play a critical role in determining the type of device and a type of program that wrote the image file. Table 1 provides the same exemplary marker (e.g., APP1-IFD0) from two distinct image files produced by two different devices (e.g., OnePlus 11 5G and Infinix Hot 40 Pro). In this example, the APP1 marker can include a sequence of key-value pairs including at least the device maker ("Make"), device model ("Model"), the orientation, Date/Time, and the YCbCr Positioning. However, depending on the type of program used to generate the image file, the key-value pairs can be present in a different order or missing certain key-value pairs. For example, as shown in Table 1, Device 1 (OnePlus 11 5G) includes a key-value pair sequence including the Image Width as the second key-value pair and the device maker as the third key-value pair in the sequence. On the other hand, Device 2 (Infinix Hot 40 Pro) includes a key-value pair sequence including the Image Width as the second key-value pair, the Image Description as the third key-value pair, and the device maker as the fourth key-value pair in the sequence. This distinction can provide an indication that the two image files were created by two different types of devices or programs.

TABLE 1

| APP1 - IFD0 | | | |
|---|---|---|---|
| OnePlus 11 5G (Device 1) | | Infinix Hot 40 Pro (Device 2) | |
| K/V Pair Sequence | Key-Value Pair | K/V Pair Sequence | Key-Value Pair |
| 1 | Image Height | 1 | Image Height |
| 2 | Image Width | 2 | Image Width |
| | | 3 | Image Description |
| 3 | Make | 4 | Make |
| 4 | Model | 5 | Model |
| 5 | Orientation | 6 | Orientation |
| 6 | X Resolution | 7 | X Resolution |
| 7 | Y Resolution | 8 | Y Resolution |
| 8 | Resolution Unit | 9 | Resolution Unit |
| | | 10 | Software |
| 9 | Date/Time | 11 | Date/Time |
| 10 | YCbCr Positioning | 12 | YCbCr Positioning |
| | | 13 | Unknown tag (0x0220) |
| | | 14 | Unknown tag (0x0221) |
| | | 15 | Unknown tag (0x0222) |
| | | 16 | Unknown tag (0x0223) |
| | | 17 | Unknown tag (0x0224) |
| | | 18 | Unknown tag (0x0225) |

In some implementations, the profile structural signature can depend on the absence of certain key-value pairs or the presence of unknown key-value pairs within the structural elements of the image file. For example, the profile structural signature could include a sequence where a first known key-value pair is followed by an unknown key-value pair, which is followed by another known key-value pair. This approach allows the profile structural signature to capture not only the sequence of known key-value pairs, but also gaps or irregularities in the structure, which can be indicative of the type of device or type of program that wrote the image file.

In some implementations, the profile structural signature can include an indicator, such as a classification label or a signature number, to further characterize the image file's origin. This classification can be associated with attributes related to the type of device or program used to generate the image file, such as the device brand, device model, device manufacturer, the operating system on the device, or the specific application used to produce the image file. For instance, the classification can indicate and distinguish that the image was created by a particular smartphone model running a specific version of its operation system.

The classification can also capture more granular distinctions. For example, even if two image files were created using the same device and operating system, the classification can differ based on other factors such as the application used to create the image or specific camera settings such as aperture or shutter speed. These additional distinctions enable the profile structural signature to provide granular forensic identification that can account for variations including different software, user settings, or contextual conditions that may not be possible by using traditional forensic analysis methods.

At 150, a visual representation of the profile structural signature can be provided using a graphical user interface (GUI). The visual representation can include a mapping of at least the first marker, sub-marker, or key from a key-value pair and the second marker, sub-marker, or key from a key-value pair. For example, the visual representation can display the structural sequence of the markers and the key-value pairs in the image file. The mapping can be presented as a list, flow diagram, tree structure, or other forms that indicate the structural order of the structural elements.

In some implementations, the visual representation can also include unknown or unidentified key-value pairs in the structural sequence. For example, the GUI can highlight gaps or placeholders where specific key-value pairs are unknown. This can be useful in forensic analysis, offering quick identification of unusual configurations of markers or key-value pairs that are characteristics of a specific device, operating system, application, etc. This can also provide a more complete view of the image file's structure, allowing gaps or unexpected elements to be spotted which can indicate issues such as file tampering, corruption, or proprietary encoding.

Figure 2:
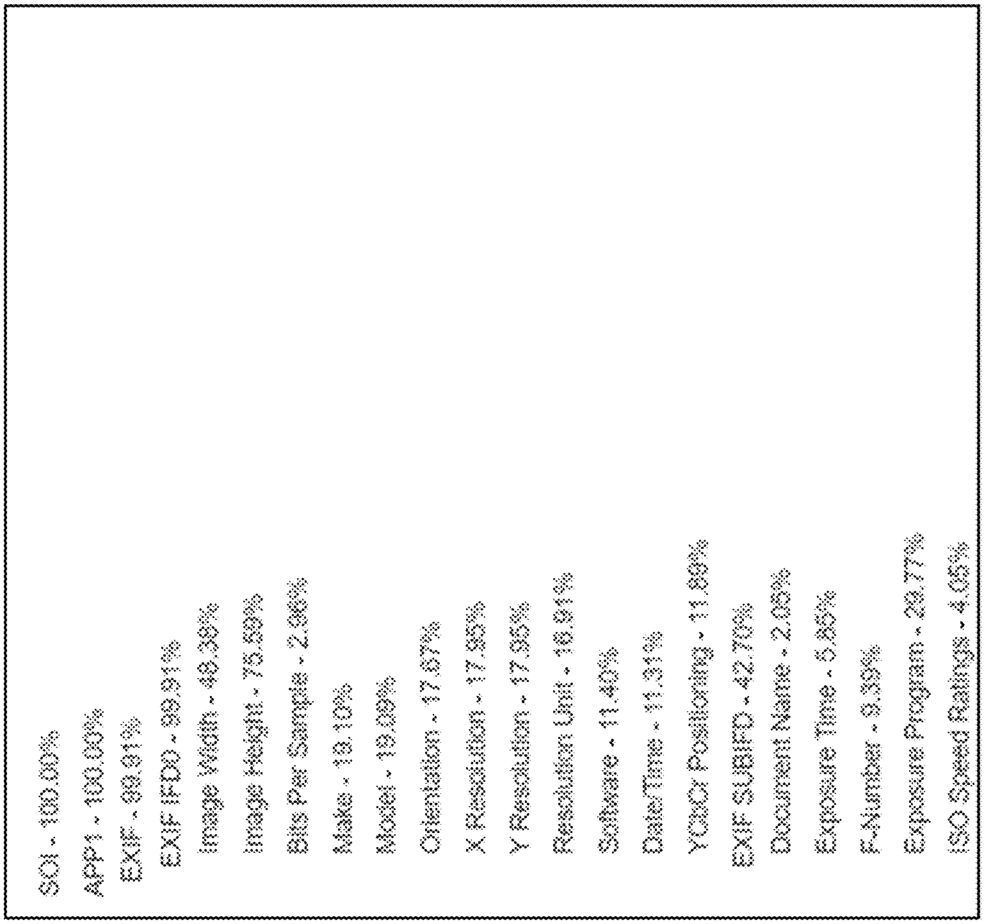
FIG. 2 is an exemplary example of the visual representation of the profile structural signature provided using a GUI.

An exemplary visual representation of the profile structural signature provided using the GUI is illustrated in FIG. 2. FIG. 2 provides a visual representation 200 includes a visual mapping of the hierarchical sequence of markers, sub-markers, and key-value pairs for an image file. For example, the visual representation 200 can include at least the markers (e.g., SOI, APP1), sub-markers (e.g., EXIF, EXIF IFD0, EXIF SUBIFD), and key-value pairs (e.g., Image Width, Image Height, Bits Per Sample, Make, Model, etc.). The visual representation 200 can include the hierarchical order of markers, sub-markers, and key-value pairs as found in the image file by displaying in descending and nested order. For example, the visual representation 200 can show the SOI marker is followed by the APP1 marker sequentially in the image file. Further, the APP1 marker can include the sub-marker EXIF, which includes a further sub-marker EXIF IFD0. The sub-marker EXIF IFD0 can include its respective keys from key-value pairs in sequential order, including Image Width, Image Height, Bits Per Sample, Make, Model, etc. The APP1 marker further includes the sub-marker EXIF SUBIFD, which is after the EXIF IFD0 sub-marker sequentially. The EXIF SUBIFD sub-marker includes its respective keys from key-value pairs in sequential order, including Document Name, Exposure Time, F-Number, etc. In some implementations, the visual representation can include percentages corresponding to each marker, sub-marker, and key-value pair. The percentage can provide an indication of the uniqueness of a given marker, sub-marker, or key-value pair in the signature as compared to known image sources in a reference library. In some implementations, the percentages can update dynamically as the population of image sources in the reference library are updated and changes.

Figure 3:
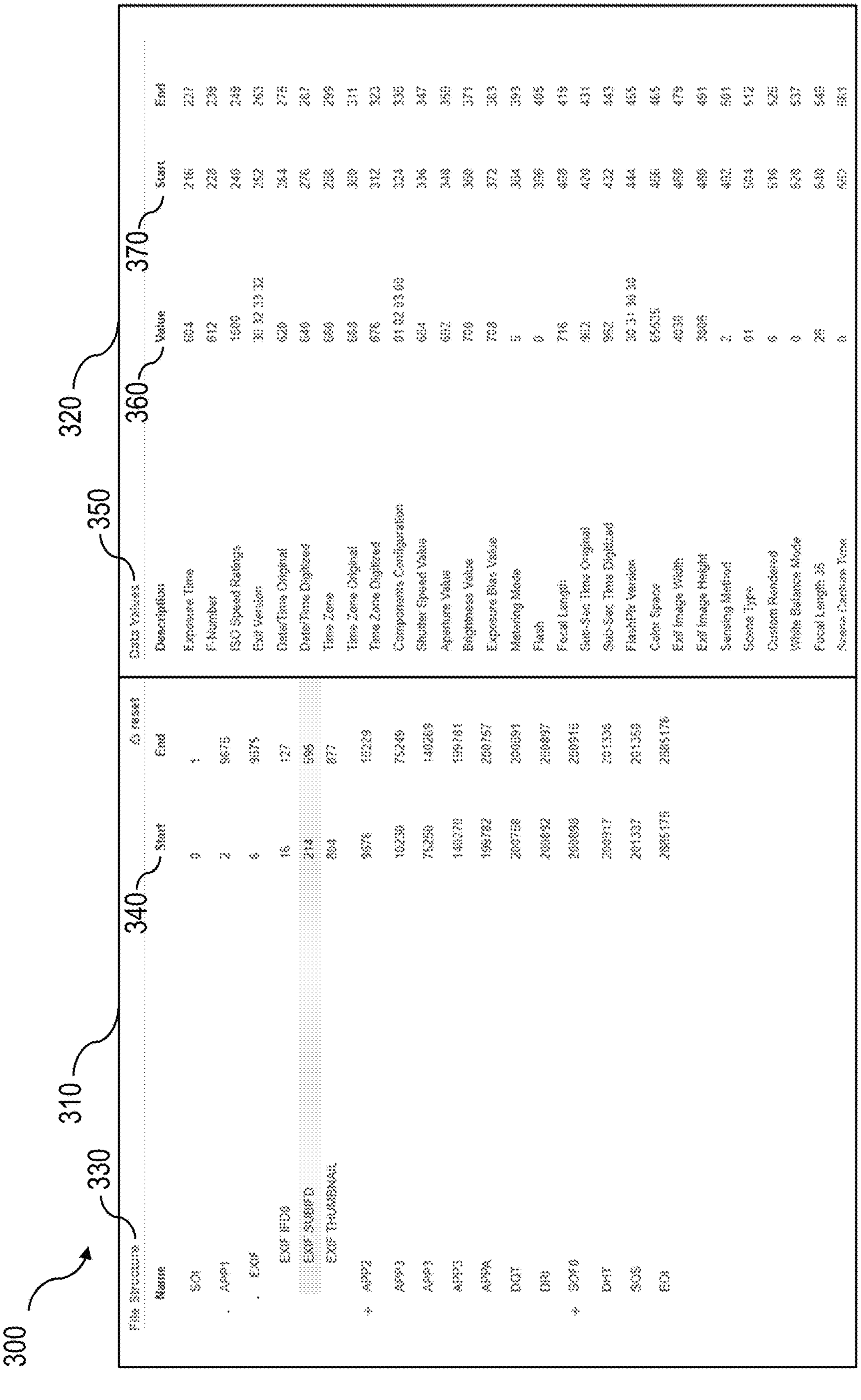
FIG. 3 is another exemplary example of the visual representation of the profile structural signature provided using a GUI.

FIG. 3 is another exemplary example of the visual representation of the profile structural signature provided using a GUI. As shown in FIG. 3, the visual representation 300 can include a visual mapping of the hierarchical sequence 310 and a visual sequence of key-value pairs corresponding to a sub-marker at 320. The mapping of the hierarchical sequence 310 can include the hierarchical order of markers and sub-markers at 330 and the start and end of the length of bytes corresponding to each element at 340. For example, the visual mapping of the hierarchical sequence 310 includes the SOI marker sequentially followed by the APP1 marker. The APP1 marker is followed respectively by the APP2 marker, APP3 marker, etc. The SOI marker corresponds to bytes 0-1 in the image file while the APP1 marker corresponds to bytes 2-9675 in the image file. Further, the APP1 marker includes the sub-marker EXIF (corresponding to bytes 6-9675), which further includes sub-markers EXIF IFD0, EXIF SUBIFD, and EXIF THUMBNAIL.

The visual representation 330 can include a visual sequence of the key-value pairs corresponding to marker or sub-marker. For example, the visual sequence of key-value pairs corresponding to sub-marker EXIF SUBIFD is shown at 320. As shown at 350, the sub-marker EXIF can include the sequence of key-value pairs including Exposure Time, F-Number, ISO Speed Ratings, etc. Each key-value pair can include corresponding data (e.g., value) associated with key-value pair at 360. For example, the "Exposure Time" key-value pair includes the value 604. Further, the "F-Number" key-value pair includes the value 612. At 370, the visual representation can provide the length of bytes corresponding to each respective key-value pair. Each marker and sub-marker, such as EXIF IFD0 or APP2, can also include a similar visual sequence of key-value pairs similar to 320.

Figure 4:
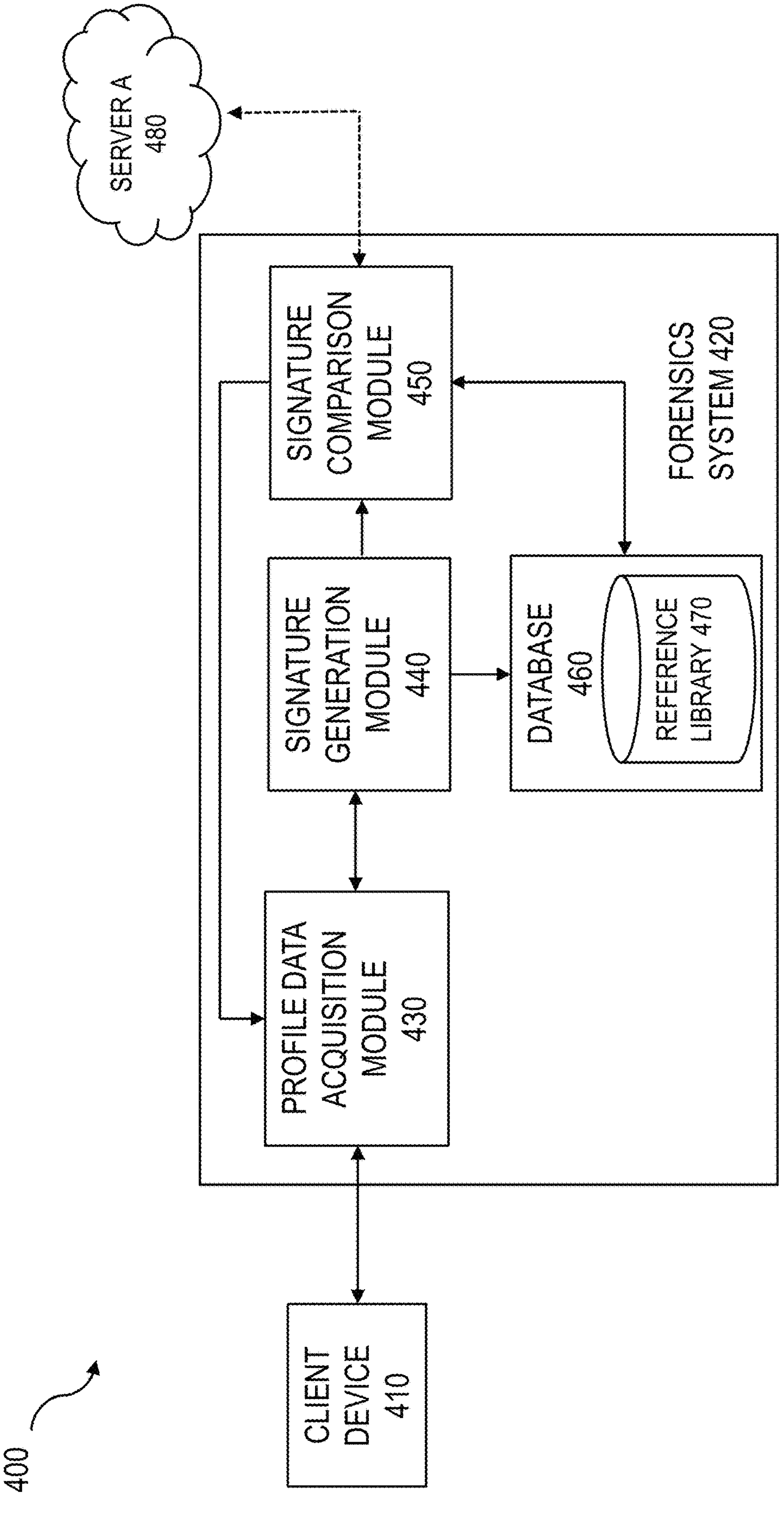
FIG. 4 is a system diagram illustrating an example system that can generate at least one profile structural signature and provide a visual representation of the profile structural signature.

FIG. 4 is a system diagram illustrating an example system 400 that can generate at least one profile structural signature and provide a visual representation of the profile structural signature. The system 400 can include client device 410, forensics system 420, and server A 480. The forensics system 420 can include a profile data acquisition module 430, a signature generation module 440, a signature comparison module 450, and a database 460 with a reference library 470.

A client device 410 can send the image file to the forensics system 420. The client device 410 can include an electronic device, such as a mobile phone, digital camera, or computing device. The client device 410 can also include a local storage, remote server, database, software service, or application designed to send images to forensics system 420. The client device 410 can further include other devices found in computerized or digital forensic environments. The client device 410 can be operatively coupled or configured to communicate with forensics system 420. In some implementations, the client device can include multiple client devices, such as multiple mobile phones, multiple network servers, etc.

The client device can send the image file to the forensics system 420 using a file transfer. The client device can also send the image file using a network connection, such as a file transfer protocol (FTP) or from a cloud-based networking environment. The client device can also send the image file using other methods of transferring digital images and data.

The profile data acquisition module 430 can receive the image file from the client device 410. The profile data acquisition module 430 can acquire image files and perform the parsing and decoding to determine the structural elements of the image file. The profile data acquisition module 430 can also include a receiver and transmitter to communicate with client device 410.

In some implementations, the profile data acquisition module 430 can determine whether the analysis can be performed on the image file. For example, if the received file is a corrupted image file or is not an image file, the profile data acquisition module 430 can provide an indication to client device 410 that the analysis cannot be performed. The profile data acquisition module 430 can determine whether image file is supported file format, such as a JPEG image, to be analyzed by the forensics system 420. In some implementations, the receiver in the profile data acquisition module 430 can receive multiple image files from various client devices.

The profile data acquisition module 430 can parse the image file to identify a plurality of structural elements. For example, the profile data acquisition module 430 can include a decoder to parse the image file's binary structure and identify the image's structural elements. The decoder can include a processing engine to parse the image file. In some implementations, the profile data acquisition module 430 can parse the image file to sequentially identify and extract the markers and sub-markers from the image file. For example, the profile data acquisition module 430 can recognize the markers by byte sequence, which serve as reference points that can delineate various segments of the image file. This can allow the profile data acquisition module 430 to systematically deconstruct the image file's binary structure to identify the markers. In some implementations, the profile data acquisition module 430 can parse the image file according to a specialized algorithm designed to decode the specific format of the image file. In some implementations, the profile data acquisition module can include multiple decoders to parse the image file with different specialized algorithms. The analysis of the decoders can be combined to make up for any deficiency that each decoder may have and as a sanity test to evaluate the correctness of the calculations of each decoder.

After identifying the markers and sub-markers, the profile data acquisition module 430 can determine the key-value pairs associated with each marker or sub-marker. For example, the marker can include a variable length of bytes, including encoded key-value pairs, that can be identified, decoded, and extracted while parsing the image file. In some implementations, information in each key-value pair can correspond to an attribute of the image file, such as the color space, device attributes, profile size, and characteristics of the image file. If known, the profile data acquisition module 430 can determine the information in each key-value pair. For example, if data within the key-value pair represents the specific values of the image dimensions or compression settings, this data can be stored along with the key-value pair. However, if the data within the key-value pair cannot be determined, the key-value pairs can still be extracted. In some implementations, if the decoder cannot identify the encoded data in the marker corresponding to the key-value pair, the decoder can record the key-value pair as unknown and move onto the next marker. Once the sequence of markers, sub-markers, and their associated key-value pairs are determined, the profile data acquisition module 430 can transmit this information to the signature generation module 440.

The signature generation module 440 can receive the sequence of markers, sub-markers, and their associated key-value pairs from the profile data acquisition module 430. The signature generation module 440 can generate the profile structural signature based on analyzing the sequence of markers, sub-markers, and key-value pairs. The signature generation module 440 can use various algorithms to analyze the sequence of markers, sub-markers, and key-value pairs in the profile structural signature. For example, the signature generation module 440 can recognize the byte sequence “0xFFE2” as the start of the APP2 marker and the associated key-value pairs.

In some implementations, the signature generation module 440 can generate the profile structural signature by incorporating known and unknown markers, sub-markers, and key-value pairs. For example, if the profile data acquisition module 430 is unable to determine a certain key-value pair, the signature generation module 440 can include an indicator or record for the unknown key-value pair in its respective location in the profile structural signature. A similar process can be followed for unknown markers and sub-markers.

The signature generation module 440 can also determine a classification label that characterizes the image file’s origin. By examining the markers, sub-markers, and key-value pairs, the signature generation module 440 can classify the profile structural signature by examining specific sequences of markers, sub-markers, and key-value pairs.

Once the profile structural signature is generated by the signature generation module 440, the signature can be sent to profile data acquisition module 430. The profile data acquisition module 430 can provide a visual representation of the profile structural signature to the client device 410 using a GUI. In some implementations, the profile data acquisition module 430 can generate a visual of the profile structural signature to be displayed on a GUI residing on the client device 410. In some implementations, the forensics system 420 can include a GUI to provide the visual representation of the profile structural signature.

The generated signature can also be stored in database 460. Database 460 can securely store, retrieve, and manage profile structural signatures. The database can include any suitable type of database, such as a relational database (e.g., Oracle database, IBM DB4, Microsoft SQL Server, MySQL, and PostgreSQL), a non-relational database (e.g., Neo4j, Redis, Apache Cassandra, Couchbase Server), a network database, a hierarchical database, an object-oriented database, a proprietary form of database, and various combinations and configurations of the foregoing. In some implementations, the generated structural signature can be stored as a sequence of named nodes (e.g., marker, sub-marker, and key names), with each named node including an ordinal position (e.g., sequential position) and a depth (e.g. hierarchical position). The sequence of named nodes can be formatted into a table with the node name, position, and depth and each row representing a named node.

In some implementations, the signature generation module 440 can normalize the generated profile structural signature before storing in database 460. For example, normalizing the signature can include extracting the sequence of the markers, sub-markers, and key-value pairs into a relationship graph and storing the graph into database 460. The graph can retain the sequence and relationship of the markers, sub-markers, and key-value pairs while reducing the amount of data to be stored overall. This can be beneficial in systems that are resource constraint or require analyzing many profile structural signatures. In some implementations, normalizing the signature can include extracting only markers, sub-markers, and key-value pairs above a specific byte length or corresponding to predetermined values. This can help reduce noise or remove structures that are irrelevant or duplicative across image files to reduce the size and complexity of the normalized signature.

In some implementations, the database 460 can include a reference library 470 which includes multiple profile structural signatures, each corresponding to a different type of device or program that wrote an image file. The reference library 470 can serve as a comprehensive catalog built from verifiable image files produced from known sources (e.g., the original device type and program is known and documented for each file). In some implementations, the reference library can include reference profile structural signatures that are pre-generated using image files produced by known devices and programs. For example, image files created by various device brands, models, operating systems, and applications can be analyzed beforehand to generate their corresponding profile structural signatures. In some implementations, the reference library can include reference profile structural signatures stored as sequences of named nodes, tables, relationship graphs, or other formats. In some implementation, the reference library can be dynamically updated with additional reference profile structural signatures or as they become available (e.g., new phone model or updated operating system).

The signature comparison module 450 can compare the generated profile structural signature with the plurality of profile structural signatures stored in the reference library 470. The signature comparison module 450 can determine a percentage match between the generated profile structural signature and the reference signatures by analyzing their structural similarities. For example, the signature comparison module 450 can compare the name and sequence of markers and key-value pairs in the profile structural signature with those in the reference signatures, assessing both the order of the structural elements and the presence or absence of certain key-value pairs in specific sequences. In some implementations, the generated structural signature, which was stored as a sequence of named nodes, can be compared to other structural signatures. For example, each row in the generated structural signature (corresponding to a marker, sub-marker, or key-value pair) can be compared to each row of other structural signatures to determine similarities and differences across each row. The similarities and differences can be documented as a percentage match between the generated structural signature and the plurality of structural signatures. In some implementations, this percentage match can be between a spectrum of 0 to 100%. In some implementations, the normalized profile structural signature can be compared to a plurality of normalized reference profile structural signatures.

Once the percentage match is determined, the signature comparison module evaluates whether the percentage match satisfies a predefine threshold. If the match meets or exceeds the threshold, the module can provide an indication of at least one type of device or program associated with the matched reference signature. The indication can provide information on the probable hardware and/or software source of the analyzed file. For example, the indication can identify the device brand, model, operating system, or the specific application used to create the image file. In situations where the match is close but not identical to those stored in the reference library 470, an indication of a likely file writer (e.g., hardware or software source) can be provided. In some implementations, the indication can include a percentage probability of a match with a known hardware or software source. In some implementations, the indication can include characteristics of the hardware (e.g., brand and/or model of the hardware device) or a determination whether the image file has been edited or not.

In some implementations, if the percentage match between the generated signature and at least one of the plurality of reference signatures is a perfect match (e.g., 100%), this can indicate that the image file was generated by the same type of device and the same type of program as those used to generate the reference signature. For example, two image files created from the same generation device running the same operating system, firmware version, and camera application (e.g., two iPhone 15 devices) can result in a perfect percentage match, providing an identification of the hardware and software source of the image file.

Once the indication is determined, it can be sent to the profile data acquisition module 430 and the indication of at least one type of device or program can be provided using the GUI. In some implementations, the predefined threshold can be updated by the client device 410.

In some implementations, the generated profile structural signature can be compared to every reference signature in the reference library 470. The signature comparison module 450 can keep track of the total number of reference signatures, percentage matches against each reference signature, specific matching markers, sub-markers, or key-value pairs, and output a list of all the compared reference signatures and their respective percentage matches.

In some implementations, if the signature comparison module 450 cannot determine a percentage match between the generated profile structural signature and the reference signatures or the percentage match is below the predefine threshold, the signature comparison module 450 can initiate an application programming interface (API) call to server A 480 to obtain further profile structural signatures stored in other reference libraries.

Figure 5:
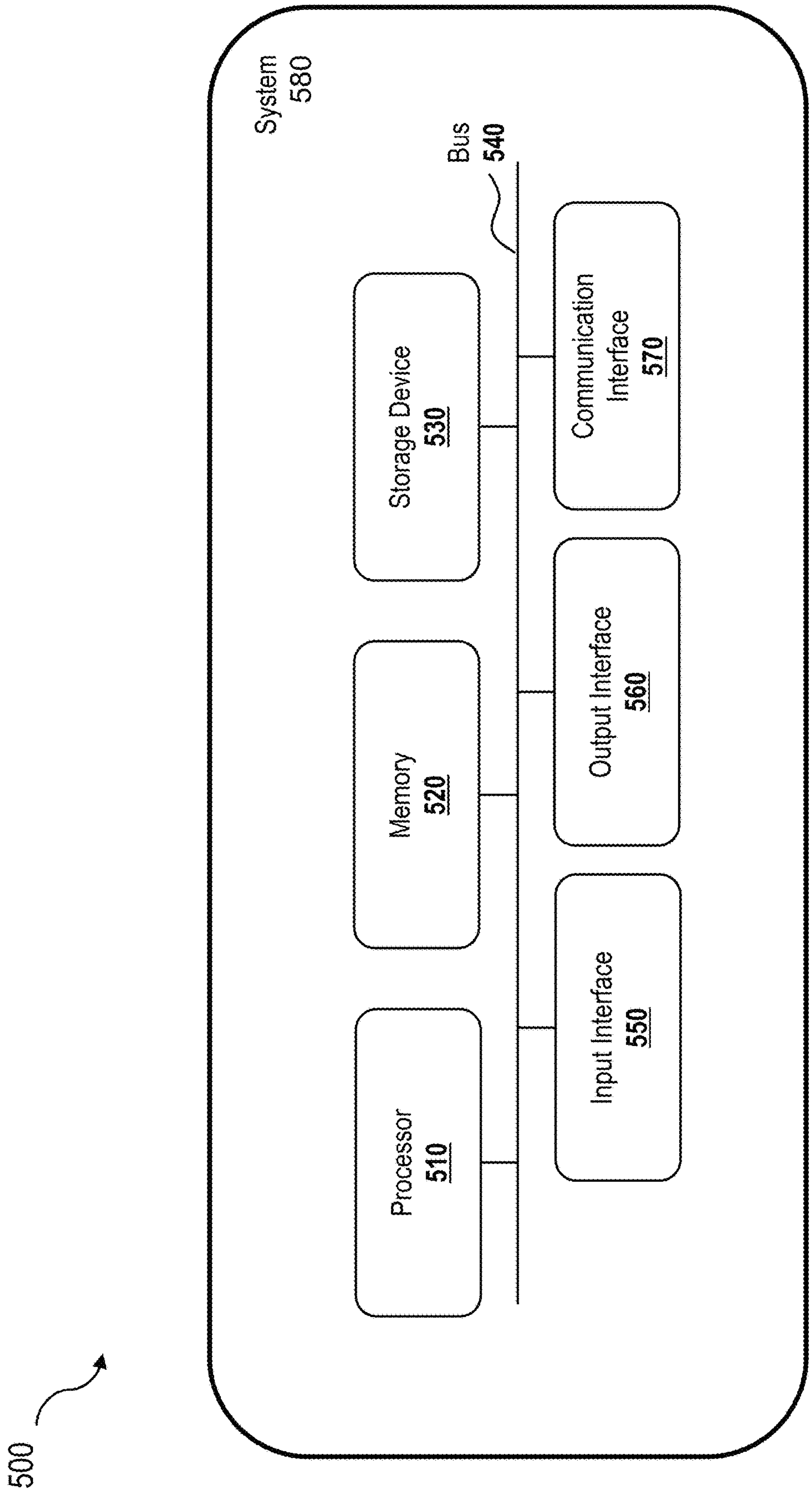
FIG. 5 is a system diagram of one or more devices and/or one or more systems of FIG. 4.

FIG. 5 is a system diagram illustrating an example system implementing forensics system 420. As illustrated, system 580 includes processor 510, memory 520, storage component 530, input interface 550, output interface 560, communication interface 570, and bus 540.

Bus 540 includes a component that permits communication among the components of system 580. In some implementations, processor 510 can be implemented in hardware, software, or a combination of hardware and software. In some examples, processor 510 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 520 includes random access memory (RAM), read-only memory (ROM), and/or another type of dynamic and/or static storage device (e.g., flash memory, magnetic memory, optical memory, and/or the like) that stores data and/or instructions for use by processor 510.

Storage component 530 stores data and/or software related to the operation and use of system 580. In some examples, storage component 530 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 550 includes a component that permits system 580 to receive information, such as via user input (e.g., a touchscreen display, a keyboard, a keypad, a mouse, a button, a switch, a microphone, a camera, and/or the like). Additionally or alternatively, in some implementations the input interface 550 includes a sensor that senses information (e.g., a global positioning system (GPS) receiver, an accelerometer, a gyroscope, an actuator, and/or the like). Output interface 560 includes a component that provides output information from system 580 (e.g., a display, a speaker, one or more light-emitting diodes (LEDs), and/or the like).

In some implementations, communication interface 570 includes a transceiver-like component (e.g., a transceiver, a separate receiver and transmitter, and/or the like) that permits system 580 to communicate with other devices via a wired connection, a wireless connection, or a combination of wired and wireless connections. In some examples, communication interface 570 permits system 580 to receive information from another system and/or provide information to another system. In some examples, communication interface 570 includes an Ethernet interface, an optical interface, a coaxial interface, an infrared interface, a radio frequency (RF) interface, a universal serial bus (USB) interface, a Wi-Fi® interface, a cellular network interface, and/or the like.

In some implementations, system 580 performs one or more processes described herein. System 580 performs these processes based on processor 510 executing software instructions stored by a computer-readable medium, such as memory 520 and/or storage component 530. A computer-readable medium (e.g., a non-transitory computer readable medium) is defined herein as a non-transitory memory device. A non-transitory memory device includes memory space located inside a single physical storage device or memory space spread across multiple physical storage devices.

In some implementations, software instructions are read into memory 520 and/or storage component 530 from another computer-readable medium or from another device via communication interface 570. When executed, software instructions stored in memory 520 and/or storage component 530 cause processor 510 to perform one or more processes described herein. Additionally or alternatively, hardwired circuitry can be used in place of or in combination with software instructions to perform one or more processes described herein. Thus, embodiments described herein are not limited to any specific combination of hardware circuitry and software unless explicitly stated otherwise.

Memory 520 and/or storage component 530 includes data storage or at least one data structure (e.g., a database and/or the like). System 580 can be capable of receiving information from, storing information in, communicating information to, or searching information stored in the data storage or the at least one data structure in memory 520 or storage component 530. In some examples, the information includes network data, input data, output data, or any combination thereof.

In some implementations, system 580 can be capable of executing software instructions that are either stored in memory 520 and/or in the memory of another device (e.g., another device that is the same as or similar to system 580). As used herein, the term "module" refers to at least one instruction stored in memory 520 and/or in the memory of another device that, when executed by processor 510 and/or by a processor of another device (e.g., another device that is the same as or similar to system 580) cause system 580 (e.g., at least one component of system 580) to perform one or more processes described herein. In some implementations, a module can be implemented in software, firmware, hardware, and/or the like.

The number and arrangement of components illustrated in FIG. 5 are provided as an example. In some implementations, system 580 can include additional components, fewer components, different components, or differently arranged components than those illustrated in FIG. 5. Additionally or alternatively, a set of components (e.g., one or more components) of system 580 can perform one or more functions described as being performed by another component or another set of components of system 580.

Figure 6:
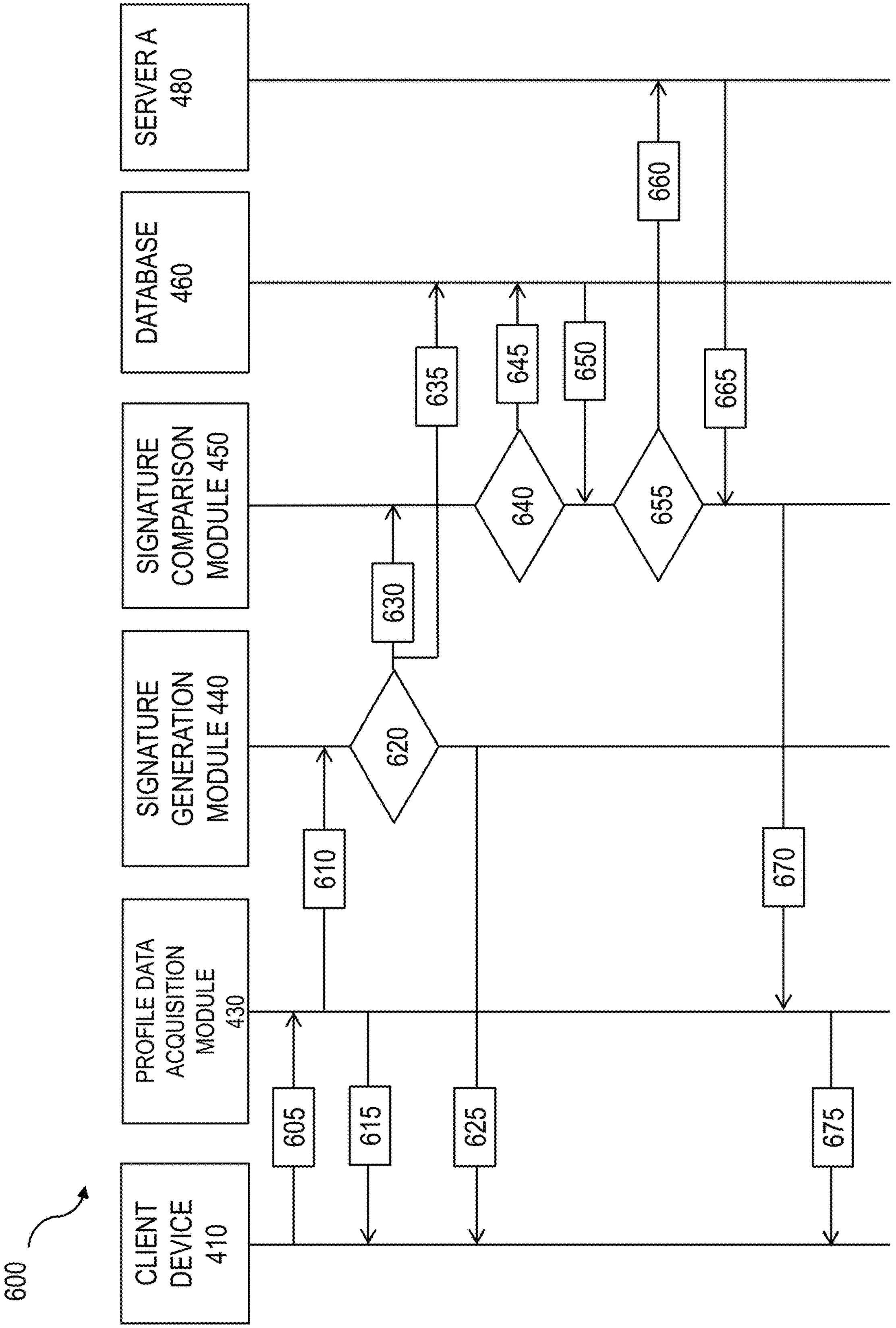
FIG. 6 is a data flow diagram illustrating an example data communication flow for generating at least one profile structural signature and providing an indication of the file writer source of an image file.

FIG. 6 is a data flow diagram illustrating an example data communication flow for generating at least one profile structural signature and providing a visual representation of the profile structural signature. At 605, the profile data acquisition module 430 can receive an image file from client device 410. The profile data acquisition module 430 can parse the image file to identify a plurality of structural elements, including at least the markers, sub-markers, and key-value pairs. For example, the profile data acquisition module 430 can include a decoder to parse the image file's binary structure and sequentially identify and extract the markers, sub-markers, and key-value pairs from the image file. At 610, the profile data acquisition module 430 can send the identified structural elements to the signature generation module 440.

The profile data acquisition module can determine whether the file format is supported. For example, if the profile data acquisition module 430 is unable to parse the image file and determine the markers, sub-markers, and key-value pairs (e.g., the image file is unsupported, corrupted, or encrypted), the profile data acquisition module 430 can send a notification to the client device 410 at step 615. In some implementations, the notification can be sent using the graphical user interface.

At 620, the signature generation module 440 can generate at least one profile structural signature based on the structural elements received from the profile data acquisition module 430. The signature generation module 440 can use various algorithms to recognize and encode the sequence of markers, sub-markers, and key-value pairs in the profile structural signature. In some implementations, the signature generation module 440 can generate the profile structural signature by incorporating the sequence of known and unknown markers, sub-markers, and key-value pairs. Once the profile structural signature is generated, the signature generation module 440 can generate a visual representation of the signature. The visual representation can be provided to the client device 410 at step 625. In some implementations, the profile structural signature is provided to the client device 410 using the graphical user interface.

Once the profile structural signature is generated, the signature can be sent to the signature comparison module 450 at step 630. At 635, the signature comparison module 450 can also send the profile structural signature to database 460 to be stored.

At 640, the signature comparison module 450 can determine a percentage match between the generated profile structural signature with a plurality of reference profile structural signatures associated with database 460. The signature comparison module 450 can determine a percentage match between the generated profile structural signature and the reference signatures by comparing the sequence of markers, sub-markers, and key-value pairs in the profile structural signature with those in the reference signatures. For example, at step 645 the signature comparison module 450 can analyze the sequence of markers, sub-markers, and key-value pairs in the generated profile structural signature and send a request to database 460 for similar marker, sub-markers, and key-value pair sequences stored in its reference library. In some implementations, the signature comparison module 450 can send the indicator for the generated profile structural signature (e.g., the classification label or the signature number) to database 460 to determine whether the indicator is present in the reference library. In some implementations, the signature comparison module 450 can assess both the order of the markers, sub-markers, and key-value pairs in the signatures and the presence or absence of certain key-value pairs in specific sequences.

At 650, database 460 can return similar reference profile structural signatures to signature comparison module 450. In some implementations, database 460 can return an indication of at least one type of device associated with each respective reference profile structural signature. In some implementations, the indication of at least one type of device is included in the reference signature.

At step 655, once the reference profile structural signature is returned, the signature comparison module can determine a percentage match of the generated profile structural signature with the reference signatures. In some implementations, the signature comparison module 450 can determine a percentage match between the generated profile structural signature and the reference signatures by analyzing their structural similarities. For example, the signature comparison module 450 can compare the name and sequence of markers, sub-markers, and key-value pairs in the profile structural signature with those in the reference signatures and determining a percentage match based on the similarities in the signatures. In some implementations, each row in the generated structural signature (corresponding to a marker, sub-marker, or key-value pair) can be compared to the plurality of structural signatures to determine similarities and differences across each row. The similarities and differences can be documented as a percentage match. In some implementations, the signature comparison module 450 can use data analysis techniques, such as pattern recognition, to recognize similarities between the generated profile structural signature and the reference signatures.

At 660, if the signature comparison module 450 cannot determine a percentage match between the generated profile structural signature and the reference signatures or the percentage match is below the predefine threshold, the signature comparison module 450 can initiate an application programming interface (API) call to server A 480 to obtain further profile structural signatures stored in other reference libraries. At 665, the profile structural signatures stored in server A 480 can be returned to the signature comparison module 450. Once the signatures are returned, step 655 can be completed on new signatures.

At 670, if the percentage match satisfies the percentage match threshold, the indication of at least one type of device can be provided to the profile data acquisition module 430. In some implementations, the generated profile structural signature and/or the reference profile structural signature can also be provided to the profile data acquisition module 430. At 675, the profile data acquisition module can provide the indication to client device 410. In some implementations, the profile data acquisition module can provide the generated profile structural signature and/or the reference profile structural signature. In some implementations, the information can be provided using the GUI.

Although a few variations have been described in detail above, other modifications or additions are possible. For example, the forensics system 420 can include multiple modules (e.g., multiple profile data acquisition modules 430, multiple signature generation modules, etc.) to parallelize the digital forensic analysis and enable faster data processing and analysis with minimal delay. In another example, the indication of at least one type of device associated with at least one of the plurality of profile structural signatures can indicate a likelihood or percentage that the image file was created by a specific type of device or type of program. As another example, the GUI can provide insights into the received image file, such as an indication whether the image file was created by client device 410 or originated from another device. Further, the GUI can explain how the identification of the type of device or program was determined. For example, the GUI can provide the exact sequence or absence of the specific marker, sub-marker, or key-value pair sequence. Additionally, if there is not an exact match, the GUI can provide indications if the image was produced by similar devices, manufacturers, etc. The GUI can also provide indications of inconsistencies with the provided image file and reference image files.

The subject matter described herein provides many technical advantages. For example, an image file can contain thousands of structural components, each comprising a large amount of data. Designing a parser to analyze the large volumes of image data can take a considerable amount of work. Further, if the image file contains a large amount of data, the parser can be computationally complex and resource consuming. Additionally, if the parser encounters a broken, corrupted, or incomplete image file with unknown datapoints, the parser could fail. The parser could also fail if the image data is encoded in a proprietary or unknown encoder.

Identifying the source device and software by using their structural signatures can provide several advantages. By focusing on the structural arrangement and sequence of the markers, sub-markers, and key-value pairs, this approach can identify the device or program regardless of the underlying data in the image file. Additionally, this approach can be less resource intensive because it avoids the need to analyze the vast amount of image data within the file. Rather than using a complex algorithm and complex processing system that can recognize the data in a potentially large and complex dataset, this approach can identify and map key structural relationships without requiring an understanding of the underlying data. This can be beneficial when analyzing large volumes of image files or within resource-constrained environments typically found in forensic environments. Another benefit of the structural analysis is its resilience to data corruption or tampering. While traditional forensics methods can be susceptible to tampering or alterations of the image data or metadata, the sequence and orientation of the markers, sub-markers, and key-value pairs will often remain intact. By analyzing the presence, or absence, of markers, sub-markers, and key-value pairs in the image file, this method can reliably analyze and produce a profile structural signature even if data in the image file has been compressed, encrypted, or tampered with. This can be useful in tampering detection and forensic reconstruction support.

The following is an exemplary profile structural signature comparison that resulted in no match between a JPEG image taken by a OnePlus 11 5G and a JPEG image taken by a Infinix Hot 40 Pro.

| OnePlus 11 5G Image File Name: 0_oneplus-11-5g_IIMG20241009124730.jpg | | | Infinix Hot 40 Pro Image File Name: Infinix-Hot 40 Pro-040.jpg | | |
|---|---|---|---|---|---|
| Node | Position | Depth | Node | Position | Depth |
| SOI - 100% | 1 | 1 | SOI - 100% | 1 | 1 |
| APP1 - 100% | 2 | 1 | APP1 - 100% | 2 | 1 |
| EXIF - 100% | 3 | 2 | EXIF - 100% | 3 | 2 |
| EXIF IFD0 - 100% | 4 | 3 | EXIF IFD0 - 100% | 4 | 3 |
| Image Width - 41% | 5 | 4 | Image Width - 41% | 5 | 4 |
| Image Height - 57% | 6 | 4 | Image Height - 57% | 6 | 4 |
| Make - 20% | 7 | 4 | Image Description - 9% | 7 | 4 |
| Model - 22% | 8 | 4 | Make - 14% | 8 | 4 |
| Orientation - 21% | 9 | 4 | Model - 14% | 9 | 4 |
| X Resolution - 47% | 10 | 4 | Orientation - 14% | 10 | 4 |
| Y Resolution - 20% | 11 | 4 | X Resolution - 14% | 11 | 4 |
| Resolution Unit - 18% | 12 | 4 | Y Resolution - 14% | 12 | 4 |
| Date/Time - 22% | 13 | 4 | Resolution Unit - 16% | 13 | 4 |
| YCbCr Positioning - 41% | 14 | 4 | Software - 10% | 14 | 4 |
| EXIF SUBIFD - 20% | 15 | 3 | Date/Time - 10% | 15 | 4 |
| Interoperability Index - 3% | 16 | 4 | YCbCr Positioning - 11% | 16 | 4 |

-continued

| OnePlus 11 5G<br>Image File Name: 0__oneplus-11-5g__IIMG20241009124730.jpg | | | Infinix Hot 40 Pro<br>Image File Name: Infinix-Hot 40 Pro-040.jpg | | |
|---|---|---|---|---|---|
| Node | Position | Depth | Node | Position | Depth |
| Interoperability Version - 3% | 17 | 4 | Unknown tag (0x0220) - 7% | 17 | 4 |
| Exposure Time - 7% | 18 | 4 | Unknown tag (0x0221) - 7% | 18 | 4 |
| F-Number - 10% | 19 | 4 | Unknown tag (0x0222) - 7% | 19 | 4 |
| Exposure Program - 11% | 20 | 4 | Unknown tag (0x0223) - 7% | 20 | 4 |
| ISO Speed Ratings - 7% | 21 | 4 | Unknown tag (0x0224) - 7% | 21 | 4 |
| Exif Version - 7% | 22 | 4 | Unknown tag (0x0225) - 7% | 22 | 3 |
| Date/Time Original - 7% | 23 | 4 | EXIF SUBIFD - 8% | 23 | 3 |
| Date/Time Digitized - 8% | 24 | 4 | Exposure Time - 7% | 24 | 4 |
| Time Zone Original - 14% | 25 | 4 | F-Number - 7% | 25 | 4 |
| Components Configuration - 6% | 26 | 4 | Exposure Program - 7% | 26 | 4 |
| Shutter Speed Value - 7% | 27 | 4 | ISO Speed Ratings - 8% | 27 | 4 |
| Aperture Value - 8% | 28 | 4 | Sensitivity Type - 5% | 28 | 4 |
| Brightness Value - 6% | 29 | 4 | Recommended Exposure Index - 5% | 29 | 4 |
| Exposure Bias Value - 6% | 30 | 4 | Exif Version - 5% | 30 | 4 |
| Max Aperture Value - 6% | 31 | 4 | Date/Time Original - 5% | 31 | 4 |
| Metering Mode - 8% | 32 | 4 | Date/Time Digitized - 5% | 32 | 4 |
| Flash - 16% | 33 | 4 | Time Zone - 2% | 33 | 4 |
| Focal Length - 8% | 34 | 4 | Time Zone Original - 2% | 34 | 4 |
| Makernote - 5% | 35 | 4 | Time Zone Digitized - 2% | 35 | 4 |
| User Comment - 2% | 36 | 4 | Components Configuration - 19% | 36 | 4 |
| Sub-Sec Time - 4% | 37 | 4 | Shutter Speed Value - 2% | 37 | 4 |
| Sub-Sec Time Original - 4% | 38 | 4 | Brightness Value - 2% | 38 | 4 |
| Sub-Sec Time Digitized - 12% | 39 | 4 | Exposure Bias Value - 2% | 39 | 4 |
| FlashPix Version - 4% | 40 | 4 | Max Aperture Value - 2% | 40 | 4 |
| Color Space - 4% | 41 | 4 | Metering Mode - 19% | 41 | 4 |
| Exif Image Width - 6% | 42 | 4 | White Balance - 2% | 42 | 4 |
| Exif Image Height - 4% | 43 | 4 | Flash - 2% | 43 | 4 |
| Sensing Method - 3% | 44 | 4 | Focal Length - 4% | 44 | 4 |
| Scene Type - 6% | 45 | 4 | Makernote - 2% | 45 | 4 |
| Exposure Mode - 5% | 46 | 4 | User Comment - 2% | 46 | 4 |
| White Balance Mode - 6% | 47 | 4 | Sub-Sec Time - 2% | 47 | 4 |
| Digital Zoom Ratio - 3% | 48 | 4 | Sub-Sec Time Original - 2% | 48 | 4 |
| Focal Length 35 - 5% | 49 | 4 | Sub-Sec Time Digitized - 2% | 49 | 4 |
| Scene Capture Type - 5% | 50 | 4 | FlashPix Version - 3% | 50 | 4 |
| Lens Model - 2% | 51 | 3 | Color Space - 2% | 51 | 4 |
| APP2 - 3% | 52 | 1 | Exif Image Width - 2% | 52 | 4 |
| ICC - 3% | 53 | 2 | Exif Image Height - 2% | 53 | 4 |
| Profile Size - 3% | 54 | 3 | Exposure Mode - 5% | 54 | 4 |

-continued

| OnePlus 11 5G Image File Name: 0__oneplus-11-5g__IIMG20241009124730.jpg | | | Infinix Hot 40 Pro Image File Name: Infinix-Hot 40 Pro-040.jpg | | |
|---|---|---|---|---|---|
| Node | Position | Depth | Node | Position | Depth |
| CMM Type - 3% | 55 | 3 | White Balance Mode - 5% | 55 | 4 |
| Version - 3% | 56 | 3 | Digital Zoom Ratio - 5% | 56 | 4 |
| Class - 3% | 57 | 3 | Focal Length 35 - 5% | 57 | 4 |
| Color space - 3% | 58 | 3 | Scene Capture Type - 5% | 58 | 4 |
| Profile Connection Space - 3% | 59 | 3 | EXIF THUMBNAIL - 5% | 59 | 3 |
| Profile Date/Time - 3% | 60 | 3 | Compression - 4% | 60 | 4 |
| Signature - 3% | 61 | 3 | Orientation - 5% | 61 | 4 |
| Primary Platform - 3% | 62 | 3 | X Resolution - 4% | 62 | 4 |
| CMM Flags - 3% | 63 | 3 | Y Resolution - 4% | 63 | 4 |
| Device manufacturer - 3% | 64 | 3 | Resolution Unit - 4% | 64 | 4 |
| Device model - 3% | 65 | 3 | Thumbnail Offset - 4% | 65 | 4 |
| Rendering Intent - 3% | 66 | 3 | Thumbnail Length - 4% | 66 | 4 |
| Device attributes - 3% | 67 | 3 | YCbCr Positioning - 5% | 67 | 4 |
| XYZ values - 3% | 68 | 3 | INTEROPERABILITY - 4% | 68 | 3 |
| Tag Count - 3% | 69 | 3 | Interoperability Index - 4% | 69 | 4 |
| Profile Description - 3% | 70 | 3 | Interoperability Version - 4% | 70 | 4 |
| Profile Copyright - 3% | 71 | 3 | APP5 - 1% | 71 | 1 |
| Media White Point - 3% | 72 | 3 | APP6 - 1% | 72 | 1 |
| Red Colorant - 3% | 73 | 3 | APP7 - 1% | 73 | 1 |
| Green Colorant - 3% | 74 | 3 | APP8 - 1% | 74 | 1 |
| Blue Colorant - 3% | 75 | 3 | DQT - 1% | 75 | 1 |
| Red TRC - 3% | 76 | 3 | DQT - 1% | 76 | 1 |
| Chromatic Adaptation - 4% | 77 | 3 | SOF0 - 3% | 77 | 1 |
| Blue TRC - 3% | 78 | 3 | JPEG - 3% | 78 | 2 |
| Green TRC - 3% | 79 | 3 | Compression Type - 3% | 79 | 3 |
| APP4 - 2% | 80 | 1 | Data Precision - 3% | 80 | 3 |
| DQT - 1% | 81 | 1 | Image Height - 3% | 81 | 3 |
| SOF0 - 1% | 82 | 1 | Image Width - 3% | 82 | 3 |
| JPEG - 1% | 83 | 2 | Number of Components - 3% | 83 | 3 |
| Compression Type - 1% | 84 | 3 | Component 1 - 3% | 84 | 3 |
| Data Precision - 1% | 85 | 3 | Component 2 - 3% | 85 | 3 |
| Image Height - 1% | 86 | 3 | Component 3 - 3% | 86 | 3 |
| Image Width - 1% | 87 | 3 | DHT - 2% | 87 | 1 |
| Number of Components - 1% | 88 | 3 | Header - 3% | 88 | 2 |
| Component 1 - 1% | 89 | 3 | Lengths - 3% | 89 | 2 |
| Component 2 - 1% | 90 | 3 | Values - 3% | 90 | 2 |
| Component 3 - 1% | 91 | 3 | DHT - 5% | 91 | 1 |
| DHT - 3% | 92 | 1 | Header - 11% | 92 | 2 |
| Header - 5% | 93 | 2 | Lengths - 11% | 93 | 2 |
| Lengths - 5% | 94 | 2 | Values - 11% | 94 | 2 |
| Values - 5% | 95 | 2 | DHT - 2% | 95 | 1 |
| Header - 4% | 96 | 2 | Header - 4% | 96 | 2 |
| Lengths - 4% | 97 | 2 | Lengths - 4% | 97 | 2 |
| Values - 4% | 98 | 2 | Values - 4% | 98 | 2 |
| Header - 1% | 99 | 2 | DHT - 1% | 99 | 1 |
| Lengths - 1% | 100 | 2 | Header - 4% | 100 | 2 |
| Values - 1% | 101 | 2 | Lengths - 4% | 101 | 2 |

-continued

| OnePlus 11 5G Image File Name: 0__oneplus-11-5g__IIMG20241009124730.jpg | | | Infinix Hot 40 Pro Image File Name: Infinix-Hot 40 Pro-040.jpg | | |
|---|---|---|---|---|---|
| Node | Position | Depth | Node | Position | Depth |
| Header - 1% | 102 | 2 | Values - 4% | 102 | 2 |
| Lengths - 1% | 103 | 2 | SOS - 1% | 103 | 1 |
| Values - 1% | 104 | 2 | EOI - 1% | 104 | 1 |
| SOS - 0% | 105 | 1 | | | |
| EOI - 0% | 106 | 1 | | | |
| Unknown Sequence - 0% | 107 | 1 | | | |

The following is an exemplary profile structural signature comparison that resulted in a full match between a two JPEG images taken by the same Infinix Hot 40 Pro.

| Infinix Hot 40 Pro Image File Name: Infinix-Hot 40 Pro-040.jpg | | | Infinix Hot 40 Pro Image File Name: Infinix-Hot 40 Pro-123.jpg | | |
|---|---|---|---|---|---|
| Node | Position | Depth | Node | Position | Depth |
| SOI - 100% | 1 | 1 | SOI - 100% | 1 | 1 |
| APP1 - 100% | 2 | 1 | APP1 - 100% | 2 | 1 |
| EXIF - 100% | 3 | 2 | EXIF - 100% | 3 | 2 |
| EXIF IFD0 - 100% | 4 | 3 | EXIF IFD0 - 100% | 4 | 3 |
| Image Width - 41% | 5 | 4 | Image Width - 41% | 5 | 4 |
| Image Height - 57% | 6 | 4 | Image Height - 57% | 6 | 4 |
| Image Description - 9% | 7 | 4 | Image Description - 9% | 7 | 4 |
| Make - 14% | 8 | 4 | Make - 14% | 8 | 4 |
| Model - 14% | 9 | 4 | Model - 14% | 9 | 4 |
| Orientation - 14% | 10 | 4 | Orientation - 14% | 10 | 4 |
| X Resolution - 14% | 11 | 4 | X Resolution - 14% | 11 | 4 |
| Y Resolution - 14% | 12 | 4 | Y Resolution - 14% | 12 | 4 |
| Resolution Unit - 16% | 13 | 4 | Resolution Unit - 16% | 13 | 4 |
| Software - 10% | 14 | 4 | Software - 10% | 14 | 4 |
| Date/Time - 10% | 15 | 4 | Date/Time - 10% | 15 | 4 |
| YCbCr Positioning - 11% | 16 | 4 | YCbCr Positioning - 11% | 16 | 4 |
| Unknown tag (0x0220) - 7% | 17 | 4 | Unknown tag (0x0220) - 7% | 17 | 4 |
| Unknown tag (0x0221) - 7% | 18 | 4 | Unknown tag (0x0221) - 7% | 18 | 4 |
| Unknown tag (0x0222) - 7% | 19 | 4 | Unknown tag (0x0222) - 7% | 19 | 4 |
| Unknown tag (0x0223) - 7% | 20 | 4 | Unknown tag (0x0223) - 7% | 20 | 4 |
| Unknown tag (0x0224) - 7% | 21 | 4 | Unknown tag (0x0224) - 7% | 21 | 4 |
| Unknown tag (0x0225) - 7% | 22 | 3 | Unknown tag (0x0225) - 7% | 22 | 3 |
| EXIF SUBIFD - 8% | 23 | 3 | EXIF SUBIFD - 8% | 23 | 3 |
| Exposure Time - 7% | 24 | 4 | Exposure Time - 7% | 24 | 4 |
| F-Number - 7% | 25 | 4 | F-Number - 7% | 25 | 4 |
| Exposure Program - 7% | 26 | 4 | Exposure Program - 7% | 26 | 4 |
| ISO Speed Ratings - 8% | 27 | 4 | ISO Speed Ratings - 8% | 27 | 4 |
| Sensitivity Type - 5% | 28 | 4 | Sensitivity Type - 5% | 28 | 4 |
| Recommended Exposure Index - 5% | 29 | 4 | Recommended Exposure Index - 5% | 29 | 4 |
| Exif Version - 5% | 30 | 4 | Exif Version - 5% | 30 | 4 |

-continued

| Infinix Hot 40 Pro Image File Name: Infinix-Hot 40 Pro-040.jpg | | | Infinix Hot 40 Pro Image File Name: Infinix-Hot 40 Pro-123.jpg | | |
|---|---|---|---|---|---|
| Node | Position | Depth | Node | Position | Depth |
| Date/Time Original - 5% | 31 | 4 | Date/Time Original - 5% | 31 | 4 |
| Date/Time Digitized - 5% | 32 | 4 | Date/Time Digitized - 5% | 32 | 4 |
| Time Zone - 2% | 33 | 4 | Time Zone - 2% | 33 | 4 |
| Time Zone Original - 2% | 34 | 4 | Time Zone Original - 2% | 34 | 4 |
| Time Zone Digitized - 2% | 35 | 4 | Time Zone Digitized - 2% | 35 | 4 |
| Components Configuration - 19% | 36 | 4 | Components Configuration - 19% | 36 | 4 |
| Shutter Speed Value - 2% | 37 | 4 | Shutter Speed Value - 2% | 37 | 4 |
| Brightness Value - 2% | 38 | 4 | Brightness Value - 2% | 38 | 4 |
| Exposure Bias Value - 2% | 39 | 4 | Exposure Bias Value - 2% | 39 | 4 |
| Max Aperture Value - 2% | 40 | 4 | Max Aperture Value - 2% | 40 | 4 |
| Metering Mode - 19% | 41 | 4 | Metering Mode - 19% | 41 | 4 |
| White Balance - 2% | 42 | 4 | White Balance - 2% | 42 | 4 |
| Flash - 2% | 43 | 4 | Flash - 2% | 43 | 4 |
| Focal Length - 4% | 44 | 4 | Focal Length - 4% | 44 | 4 |
| Makernote - 2% | 45 | 4 | Makernote - 2% | 45 | 4 |
| User Comment - 2% | 46 | 4 | User Comment - 2% | 46 | 4 |
| Sub-Sec Time - 2% | 47 | 4 | Sub-Sec Time - 2% | 47 | 4 |
| Sub-Sec Time Original - 2% | 48 | 4 | Sub-Sec Time Original - 2% | 48 | 4 |
| Sub-Sec Time Digitized - 2% | 49 | 4 | Sub-Sec Time Digitized - 2% | 49 | 4 |
| FlashPix Version - 3% | 50 | 4 | FlashPix Version - 3% | 50 | 4 |
| Color Space - 2% | 51 | 4 | Color Space - 2% | 51 | 4 |
| Exif Image Width - 2% | 52 | 4 | Exif Image Width - 2% | 52 | 4 |
| Exif Image Height - 2% | 53 | 4 | Exif Image Height - 2% | 53 | 4 |
| Exposure Mode - 5% | 54 | 4 | Exposure Mode - 5% | 54 | 4 |
| White Balance Mode - 5% | 55 | 4 | White Balance Mode - 5% | 55 | 4 |
| Digital Zoom Ratio - 5% | 56 | 4 | Digital Zoom Ratio - 5% | 56 | 4 |
| Focal Length 35 - 5% | 57 | 4 | Focal Length 35 - 5% | 57 | 4 |
| Scene Capture Type - 5% | 58 | 4 | Scene Capture Type - 5% | 58 | 4 |
| EXIF THUMBNAIL - 5% | 59 | 3 | EXIF THUMBNAIL - 5% | 59 | 3 |
| Compression - 4% | 60 | 4 | Compression - 4% | 60 | 4 |
| Orientation - 5% | 61 | 4 | Orientation - 5% | 61 | 4 |
| X Resolution - 4% | 62 | 4 | X Resolution - 4% | 62 | 4 |
| Y Resolution - 4% | 63 | 4 | Y Resolution - 4% | 63 | 4 |
| Resolution Unit - 4% | 64 | 4 | Resolution Unit - 4% | 64 | 4 |
| Thumbnail Offset - 4% | 65 | 4 | Thumbnail Offset - 4% | 65 | 4 |
| Thumbnail Length - 4% | 66 | 4 | Thumbnail Length - 4% | 66 | 4 |
| YCbCr Positioning - 5% | 67 | 4 | YCbCr Positioning - 5% | 67 | 4 |

-continued

| Infinix Hot 40 Pro Image File Name: Infinix-Hot 40 Pro-040.jpg | | | Infinix Hot 40 Pro Image File Name: Infinix-Hot 40 Pro-123.jpg | | |
|---|---|---|---|---|---|
| Node | Position | Depth | Node | Position | Depth |
| INTEROPERABILITY - 4% | 68 | 3 | INTEROPERABILITY - 4% | 68 | 3 |
| Interoperability Index - 4% | 69 | 4 | Interoperability Index - 4% | 69 | 4 |
| Interoperability Version - 4% | 70 | 4 | Interoperability Version - 4% | 70 | 4 |
| APP5 - 1% | 71 | 1 | APP5 - 1% | 71 | 1 |
| APP6 - 1% | 72 | 1 | APP6 - 1% | 72 | 1 |
| APP7 - 1% | 73 | 1 | APP7 - 1% | 73 | 1 |
| APP8 - 1% | 74 | 1 | APP8 - 1% | 74 | 1 |
| DQT - 1% | 75 | 1 | DQT - 1% | 75 | 1 |
| DQT - 1% | 76 | 1 | DQT - 1% | 76 | 1 |
| SOF0 - 3% | 77 | 1 | SOF0 - 3% | 77 | 1 |
| JPEG - 3% | 78 | 2 | JPEG - 3% | 78 | 2 |
| Compression Type - 3% | 79 | 3 | Compression Type - 3% | 79 | 3 |
| Data Precision - 3% | 80 | 3 | Data Precision - 3% | 80 | 3 |
| Image Height - 3% | 81 | 3 | Image Height - 3% | 81 | 3 |
| Image Width - 3% | 82 | 3 | Image Width - 3% | 82 | 3 |
| Number of Components - 3% | 83 | 3 | Number of Components - 3% | 83 | 3 |
| Component 1 - 3% | 84 | 3 | Component 1 - 3% | 84 | 3 |
| Component 2 - 3% | 85 | 3 | Component 2 - 3% | 85 | 3 |
| Component 3 - 3% | 86 | 3 | Component 3 - 3% | 86 | 3 |
| DHT - 2% | 87 | 1 | DHT - 2% | 87 | 1 |
| Header - 3% | 88 | 2 | Header - 3% | 88 | 2 |
| Lengths - 3% | 89 | 2 | Lengths - 3% | 89 | 2 |
| Values - 3% | 90 | 2 | Values - 3% | 90 | 2 |
| DHT - 5% | 91 | 1 | DHT - 5% | 91 | 1 |
| Header - 11% | 92 | 2 | Header - 11% | 92 | 2 |
| Lengths - 11% | 93 | 2 | Lengths - 11% | 93 | 2 |
| Values - 11% | 94 | 2 | Values - 11% | 94 | 2 |
| DHT - 2% | 95 | 1 | DHT - 2% | 95 | 1 |
| Header - 4% | 96 | 2 | Header - 4% | 96 | 2 |
| Lengths - 4% | 97 | 2 | Lengths - 4% | 97 | 2 |
| Values - 4% | 98 | 2 | Values - 4% | 98 | 2 |
| DHT - 1% | 99 | 1 | DHT - 1% | 99 | 1 |
| Header - 4% | 100 | 2 | Header - 4% | 100 | 2 |
| Lengths - 4% | 101 | 2 | Lengths - 4% | 101 | 2 |
| Values - 4% | 102 | 2 | Values - 4% | 102 | 2 |
| SOS - 1% | 103 | 1 | SOS - 1% | 103 | 1 |
| EOI - 1% | 104 | 1 | EOI - 1% | 104 | 1 |

Further non-limiting aspects or embodiments are set forth in the following numbered examples:

Example 1: A method, comprising: receiving an image file; parsing the image file to identify a plurality of structural elements of the image file; determining, based on one or more identified structural elements, at least a first marker, sub-marker, or key-value pair and a second marker, sub-marker, or key-value pair associated with the image file; generating, based on the identified structural elements and at least the first marker, sub-marker, or key-value pair and the second marker, sub-marker, or key-value pair, at least one profile structural signature that characterizes a combination of attributes specific to at least one of a type of device and a type of program that wrote the image file; and providing, using a graphical user interface, a visual representation of the profile structural signature, wherein the visual representation includes a mapping of at least the first marker, sub-marker, or key-value pair and the second marker, sub-marker, or key-value pair.

Example 2: The method of example 1, further comprising: determining a percentage match of the at least one profile structural signature with a plurality of profile structural signatures associated with a database; and providing, using the graphical user interface, an indication of at least one type of device or program associated with at least one of the plurality of profile structural signatures in response to the percentage match satisfying a percentage match threshold.

Example 3: The method of example 2, wherein the determining a percentage match further comprises: comparing at least the first marker, sub-marker, or key-value pair and the second marker, sub-marker, or key-value pair with a plurality of markers, sub-markers, or key-value pairs associated with the plurality of profile structural signatures; and determining the percentage match based on a level of similarity during the comparison.

Example 4: The method of any of the preceding examples, further comprising: transforming the generated at least one profile structural signature into a normalized profiled structural signature; and wherein at the step of determining a percentage match, the normalized profile structural signature is compared to the plurality of structural signatures associated with the database.

Example 5: The method of example 4, further comprising storing the normalized profile structural signature in the database.

Example 6: The method of any of the preceding examples, wherein generating the at least one profile structural signature further comprises: determining a position of the one or more identified structural elements in a sequence of the plurality of structural elements of the image file; and determining an arrangement of at least the first marker, sub-marker, or key-value pair and the second marker, sub-marker, or key-value pair relative to a plurality of markers, sub-markers, or key-value pairs associated with the plurality of structural elements.

Example 7: The method of any of the preceding examples, wherein the generation of the at least one profile structural signature further comprises a presence or absence of additional markers, sub-markers, or key-value pairs among the first marker, sub-marker, or key-value pair and the second marker, sub-marker, or key-value pair in a predetermined order.

Example 8: The method of any of the preceding examples, wherein: the first marker, sub-marker, or key-value pair includes a first sequence of bytes corresponding to a first grouping of data structures; and the second marker, sub-marker, or key-value pair includes a second sequence of bytes corresponding to a second grouping of data structures, the second grouping including a greater number of data structures than the first grouping.

Example 9: A system, comprising: at least one data processor; and memory storing instructions configured to cause the at least one data processor to perform operations comprising: receiving an image file; parsing the image file to identify a plurality of structural elements of the image file; determining, based on one or more identified structural elements, at least a first marker, sub-marker, or key-value pair and a second marker, sub-marker, or key-value pair associated with the image file; generating, based on the identified structural elements and at least the first marker, sub-marker, or key-value pair and the second marker, sub-marker, or key-value pair, at least one profile structural signature that characterizes a combination of attributes specific to at least one of a type of device and a type of program that wrote the image file; and providing, using a graphical user interface, a visual representation of the profile structural signature, wherein the visual representation includes a mapping of at least the first marker, sub-marker, or key-value pair and the second marker, sub-marker, or key-value pair.

Example 10: The system of example 9, further comprising: determining a percentage match of the at least one profile structural signature with a plurality of profile structural signatures associated with a database; and providing, using the graphical user interface, an indication of at least one type of device or program associated with at least one of the plurality of profile structural signatures in response to the percentage match satisfying a percentage match threshold.

Example 11: The system of example 10, wherein the determining a percentage match further comprises: comparing at least the first marker, sub-marker, or key-value pair and the second marker, sub-marker, or key-value pair with a plurality of markers, sub-markers, or key-value pairs associated with the plurality of profile structural signatures; and determining the percentage match based on a level of similarity during the comparison.

Example 12: The system of any of the preceding examples, further comprising: transforming the generated at least one profile structural signature into a normalized profiled structural signature; and wherein at the step of determining a percentage match, the normalized profile structural signature is compared to the plurality of structural signatures associated with the database.

Example 13: The system of example 12, further comprising storing the normalized profile structural signature in the database.

Example 14: The system of any of the preceding examples, wherein generating the at least one profile structural signature further comprises: determining a position of the one or more identified structural elements in a sequence of the plurality of structural elements of the image file; and determining an arrangement of at least the first marker, sub-marker, or key-value pair and the second marker, sub-marker, or key-value pair relative to a plurality of markers, sub-markers, or key-value pairs associated with the plurality of structural elements.

Example 15: The system of any of the preceding examples, wherein the generation of the at least one profile structural signature further comprises a presence or absence of additional markers, sub-markers, or key-value pairs among the first marker, sub-marker, or key-value pair and the second marker, sub-marker, or key-value pair in a predetermined order.

Example 16: The system of any of the preceding examples, wherein: the first marker, sub-marker, or key-value pair includes a first sequence of bytes corresponding to a first grouping of data structures; and the second marker, sub-marker, or key-value pair includes a second sequence of bytes corresponding to a second grouping of data structures, the second grouping including a greater number of data structures than the first grouping.

Example 17: A non-transitory computer program product storing instructions which, when executed by at least one data processor forming part of at least one computing system, cause the at least one data processor to implement operations comprising: receiving an image file; parsing the image file to identify a plurality of structural elements of the image file; determining, based on one or more identified structural elements, at least a first marker, sub-marker, or key-value pair and a second marker, sub-marker, or key-value pair associated with the image file; generating, based on the identified structural elements and at least the first marker, sub-marker, or key-value pair and the second marker, sub-marker, or key-value pair, at least one profile structural signature that characterizes a combination of attributes specific to at least one of a type of device and a type of program that wrote the image file; and providing, using a graphical user interface, a visual representation of the profile structural signature, wherein the visual representation includes a mapping of at least the first marker, sub-marker, or key-value pair and the second marker, sub-marker, or key-value pair.

Example 18: The non-transitory computer program product of example 17, further comprising: determining a percentage match of the at least one profile structural signature with a plurality of profile structural signatures associated with a database; and providing, using the graphical user interface, an indication of at least one type of device or program associated with at least one of the plurality of profile structural signatures in response to the percentage match satisfying a percentage match threshold.

Example 19: The non-transitory computer program product of claim 17, wherein the determining a percentage match further comprises: comparing at least the first marker, sub-marker, or key-value pair and the second marker, sub-marker, or key-value pair with a plurality of markers, sub-markers, or key-value pairs associated with the plurality of profile structural signatures; and determining the percentage match based on a level of similarity during the comparison.

Example 20: The non-transitory computer program product of any of the preceding examples, wherein generating the at least one profile structural signature further comprises: determining a position of the one or more identified structural elements in a sequence of the plurality of structural elements of the image file; and determining an arrangement of at least the first marker, sub-marker, or key-value pair and the second marker, sub-marker, or key-value pair relative to a plurality of markers, sub-markers, or key-value pairs associated with the plurality of structural elements.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method, comprising:

receiving an image file;

parsing the image file to identify a plurality of structural elements of the image file, wherein the plurality of structural elements are identified by delineating between recognizable byte sequences corresponding to known data segments and unrecognizable byte sequences corresponding to unknown data segments within the image file;

determining, based on one or more recognizable or unrecognizable byte sequences from the identified structural elements, at least a first marker, sub-marker, or key-value pair and a second marker, sub-marker, or key-value pair associated with the image file;

generating, based on the identified structural elements and at least the first marker, sub-marker, or key-value pair and the second marker, sub-marker, or key-value pair, at least one profile structural signature that characterizes a combination of attributes specific to at least one of a type of device and a type of program that wrote the image file; and providing, using a graphical user interface, a visual representation of the profile structural signature, wherein the visual representation includes a mapping indicating a hierarchical sequence of at least the first marker, sub-marker, or key-value pair and the second marker, sub-marker, or key-value pair arranged according to an ordinal position and hierarchical depth within the image file.

2. The method of claim 1, further comprising:

determining a percentage match of the at least one profile structural signature with a plurality of profile structural signatures associated with a database; and providing, using the graphical user interface, an indication of at least one type of device or program associated with at least one of the plurality of profile structural signatures in response to the percentage match satisfying a percentage match threshold.

3. The method of claim 2, wherein the determining a percentage match further comprises:

comparing at least the first marker, sub-marker, or key-value pair and the second marker, sub-marker, or key-value pair with a plurality of markers, sub-markers, or key-value pairs associated with the plurality of profile structural signatures; and determining the percentage match based on a level of similarity during the comparison.

4. The method of claim 2, further comprising:

transforming the generated at least one profile structural signature into a normalized profiled structural signature; and wherein at the step of determining a percentage match, the normalized profile structural signature is compared to the plurality of structural signatures associated with the database.

5. The method of claim 4, further comprising storing the normalized profile structural signature in the database.

6. The method of claim 1, wherein generating the at least one profile structural signature further comprises:

determining a position of the one or more identified structural elements in a sequence of the plurality of structural elements of the image file; and determining an arrangement of at least the first marker, sub-marker, or key-value pair and the second marker, sub-marker, or key-value pair relative to a plurality of markers, sub-markers, or key-value pairs associated with the plurality of structural elements.

7. The method of claim 6, wherein the generation of the at least one profile structural signature further comprises a presence or absence of additional markers, sub-markers, or key-value pairs among the first marker, sub-marker, or key-value pair and the second marker, sub-marker, or key-value pair in a predetermined order.

8. The method of claim 1, wherein:

the first marker, sub-marker, or key-value pair includes a first sequence of bytes corresponding to a first grouping of data structures; and the second marker, sub-marker, or key-value pair includes a second sequence of bytes corresponding to a second grouping of data structures, the second grouping including a greater number of data structures than the first grouping.

9. A system, comprising:

at least one data processor; and memory storing instructions configured to cause the at least one data processor to perform operations comprising:

receiving an image file;

parsing the image file to identify a plurality of structural elements of the image file, wherein the plurality of structural elements are identified by delineating between recognizable byte sequences corresponding to known data segments and unrecognizable byte sequences corresponding to unknown data segments within the image file;

determining, based on one or more recognizable or unrecognizable byte sequences from the identified structural elements, at least a first marker, sub-marker, or key-value pair and a second marker, sub-marker, or key-value pair associated with the image file;

generating, based on the identified structural elements and at least the first marker, sub-marker, or key-value pair and the second marker, sub-marker, or key-value pair, at least one profile structural signature that characterizes a combination of attributes specific to at least one of a type of device and a type of program that wrote the image file; and providing, using a graphical user interface, a visual representation of the profile structural signature, wherein the visual representation includes a mapping indicating a hierarchical sequence of at least the first marker, sub-marker, or key-value pair and the second marker, sub-marker, or key-value pair arranged according to an ordinal position and a hierarchical depth within the image file.

10. The system of claim 9, further comprising:

determining a percentage match of the at least one profile structural signature with a plurality of profile structural signatures associated with a database; and providing, using the graphical user interface, an indication of at least one type of device or program associated with at least one of the plurality of profile structural signatures in response to the percentage match satisfying a percentage match threshold.

11. The system of claim 10, wherein the determining a percentage match further comprises:

comparing at least the first marker, sub-marker, or key-value pair and the second marker, sub-marker, or key-value pair with a plurality of markers, sub-markers, or key-value pairs associated with the plurality of profile structural signatures; and determining the percentage match based on a level of similarity during the comparison.

12. The system of claim 10, further comprising:

transforming the generated at least one profile structural signature into a normalized profiled structural signature; and wherein at the step of determining a percentage match, the normalized profile structural signature is compared to the plurality of structural signatures associated with the database.

13. The system of claim 12, further comprising storing the normalized profile structural signature in the database.

14. The system of claim 9, wherein generating the at least one profile structural signature further comprises:

determining a position of the one or more identified structural elements in a sequence of the plurality of structural elements of the image file; and determining an arrangement of at least the first marker, sub-marker, or key-value pair and the second marker, sub-marker, or key-value pair relative to a plurality of markers, sub-markers, or key-value pairs associated with the plurality of structural elements.

15. The system of claim 14, wherein the generation of the at least one profile structural signature further comprises a presence or absence of additional markers, sub-markers, or key-value pairs among the first marker, sub-marker, or key-value pair and the second marker, sub-marker, or key-value pair in a predetermined order.

16. The system of claim 9, wherein:

the first marker, sub-marker, or key-value pair includes a first sequence of bytes corresponding to a first grouping of data structures; and the second marker, sub-marker, or key-value pair includes a second sequence of bytes corresponding to a second grouping of data structures, the second grouping including a greater number of data structures than the first grouping.

17. A non-transitory computer program product storing instructions which, when executed by at least one data processor forming part of at least one computing system, cause the at least one data processor to implement operations comprising:

receiving an image file;

parsing the image file to identify a plurality of structural elements of the image file, wherein the plurality of structural elements are identified by delineating between recognizable byte sequences corresponding to known data segments and unrecognizable byte sequences corresponding to unknown data segments within the image file;

determining, based on one or more recognizable or unrecognizable byte sequences from the identified structural elements, at least a first marker, sub-marker, or key-value pair and a second marker, sub-marker, or key-value pair associated with the image file;

generating, based on the identified structural elements and at least the first marker, sub-marker, or key-value pair and the second marker, sub-marker, or key-value pair, at least one profile structural signature that characterizes a combination of attributes specific to at least one of a type of device and a type of program that wrote the image file; and providing, using a graphical user interface, a visual representation of the profile structural signature, wherein the visual representation includes a mapping indicating a hierarchical sequence of at least the first marker, sub-marker, or key-value pair and the second marker, sub-marker, or key-value pair arranged according to an ordinal position and a hierarchical depth within the image file.

18. The non-transitory computer program product of claim 17, further comprising:

determining a percentage match of the at least one profile structural signature with a plurality of profile structural signatures associated with a database; and providing, using the graphical user interface, an indication of at least one type of device or program associated with at least one of the plurality of profile structural signatures in response to the percentage match satisfying a percentage match threshold.

19. The non-transitory computer program product of claim 17, wherein the determining a percentage match further comprises:

comparing at least the first marker, sub-marker, or key-value pair and the second marker, sub-marker, or key-value pair with a plurality of markers, sub-markers, or key-value pairs associated with the plurality of profile structural signatures; and determining the percentage match based on a level of similarity during the comparison.

20. The non-transitory computer program product of claim 17, wherein generating the at least one profile structural signature further comprises:

determining a position of the one or more identified structural elements in a sequence of the plurality of structural elements of the image file; and determining an arrangement of at least the first marker, sub-marker, or key-value pair and the second marker, sub-marker, or key-value pair relative to a plurality of markers, sub-markers, or key-value pairs associated with the plurality of structural elements.

* * * * *